Aug. 1, 1939.    J. B. DYER    2,167,646
ENGINE STARTER CONTROL APPARATUS
Original Filed July 12, 1934    5 Sheets-Sheet 3
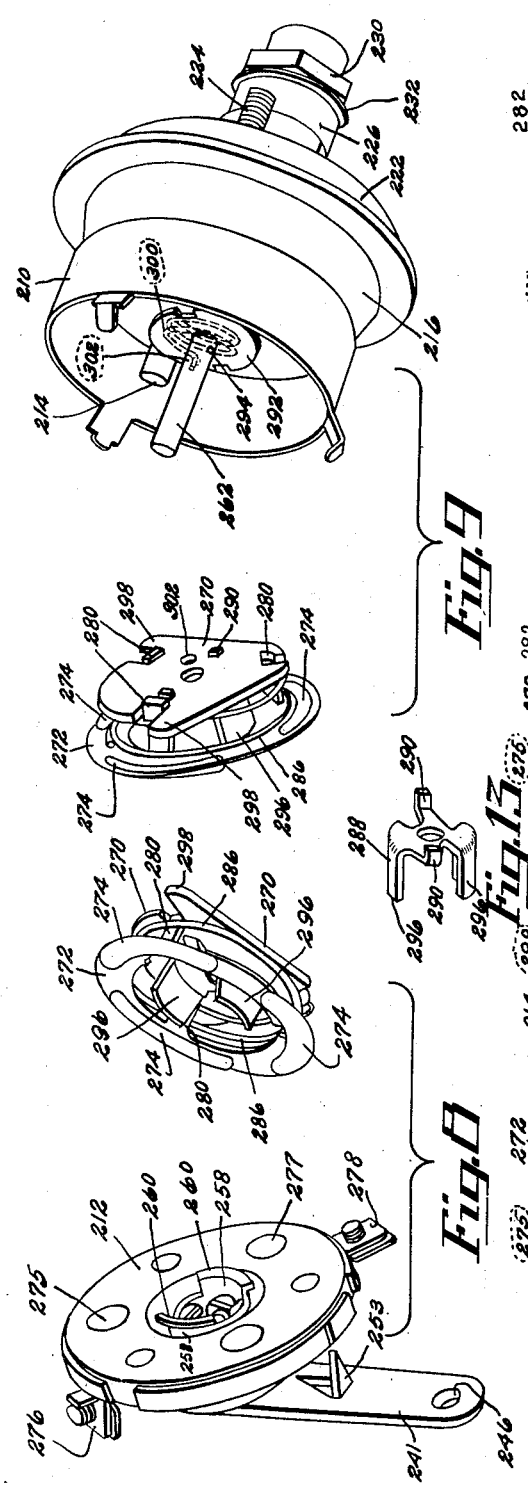
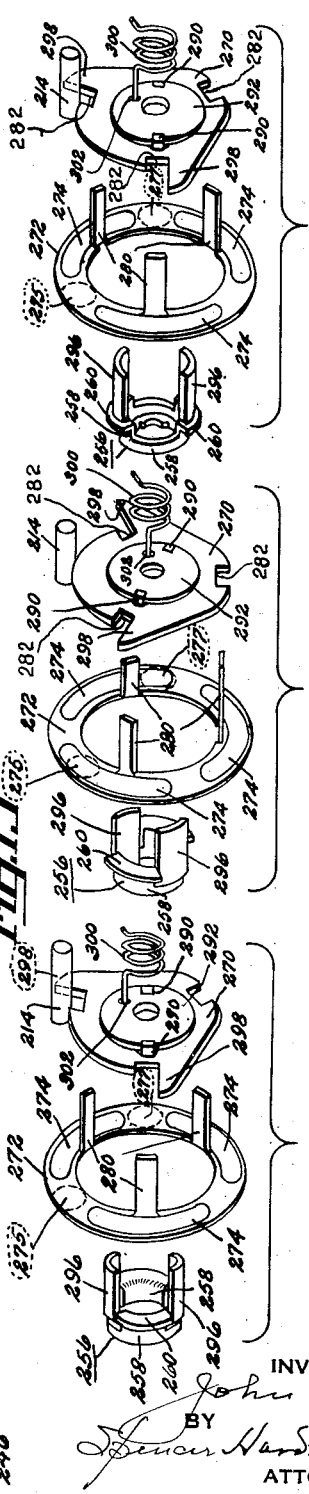
INVENTOR
John B. Dyer
BY
Spencer Hardman & Feder
ATTORNEY Aug. 1, 1939.   J. B. DYER   2,167,646
ENGINE STARTER CONTROL APPARATUS
Original Filed July 12, 1934   5 Sheets-Sheet 4

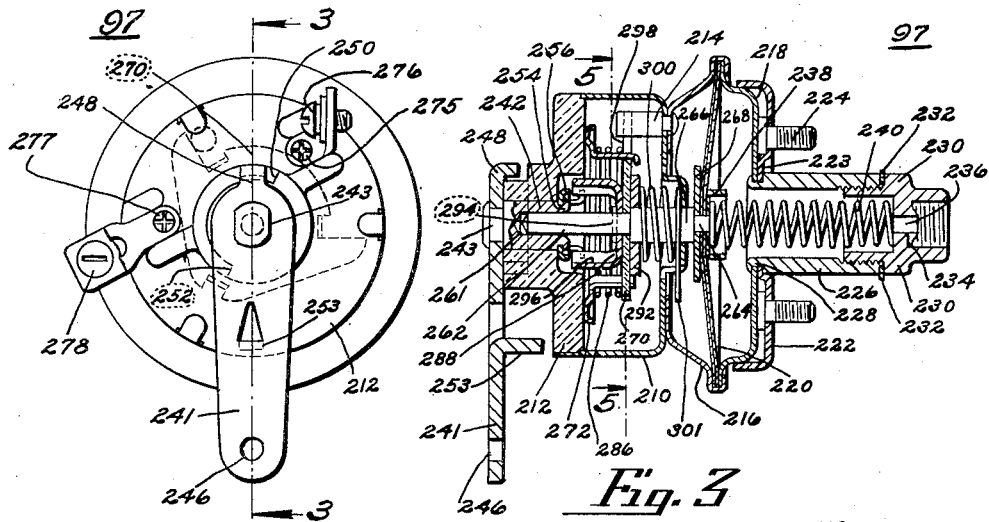
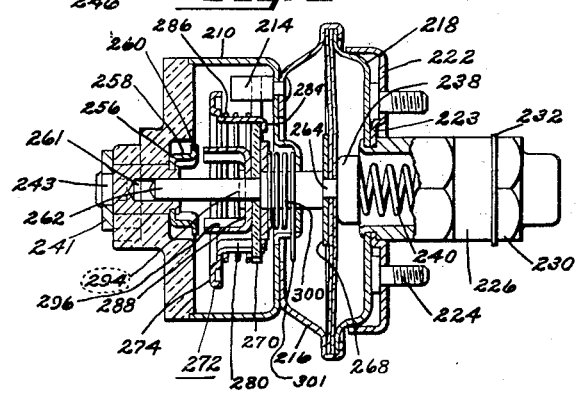
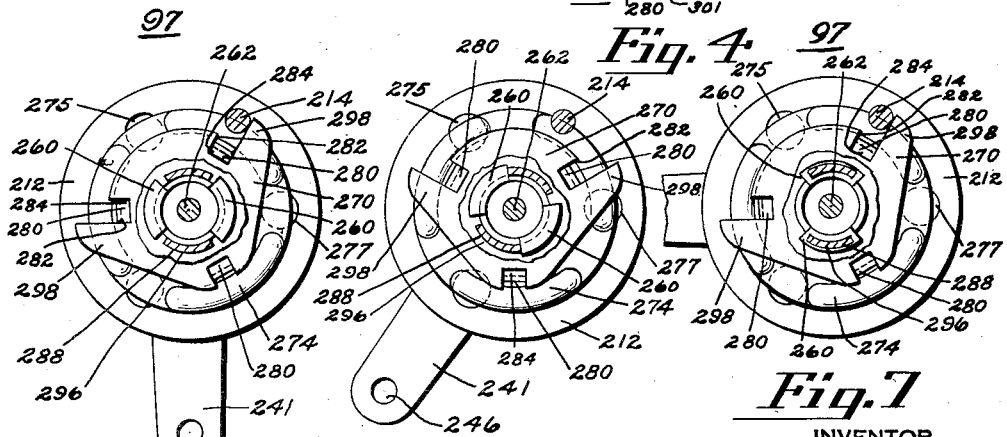

INVENTOR
John B. Dyer
BY
ATTORNEY

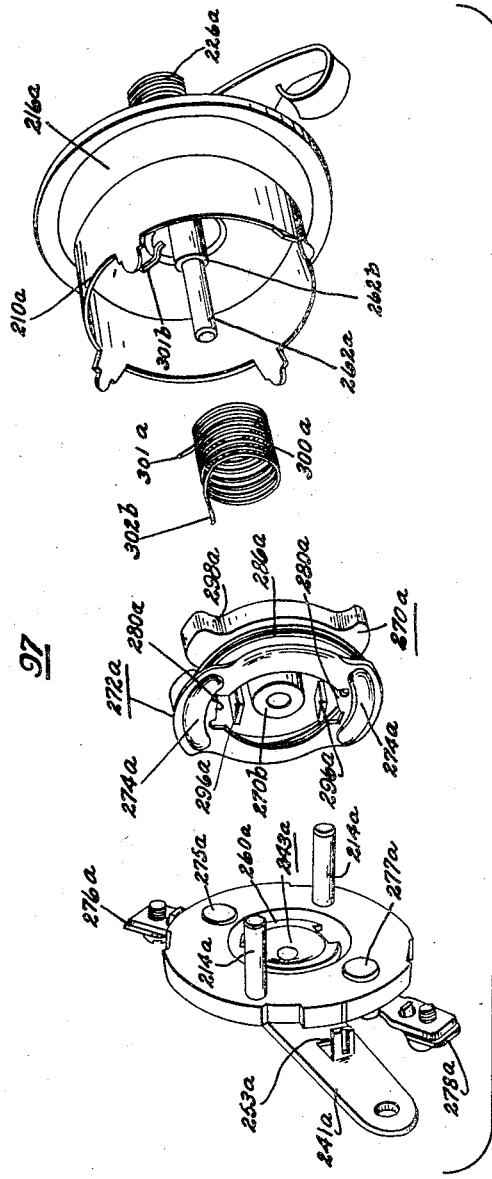

Patented Aug. 1, 1939

2,167,646

UNITED STATES PATENT OFFICE 2,167,646

ENGINE STARTER CONTROL APPARATUS

John B. Dyer, Dayton, Ohio, assignor to General Motors Corporation, Detroit, Mich., a corporation of Delaware Application July 12, 1934, Serial No. 734,740
Renewed October 24, 1938

26 Claims. (Cl. 200—52)

This invention relates to a system of control for the starting apparatus of internal combustion engines and particularly to those engines used on automotive vehicles.

This application is a continuation in part of the copending application of John B. Dyer, Serial Number 653,983, filed January 28, 1933 for Engine control system. That application discloses a circuit which requires the closing of the ignition switch and the closing of a switch coordinated with the engine throttle actuator or accelerator pedal in order to establish a relay magnet circuit whereby a starter control relay switch is closed in order to effect the closing of other circuits which will cause an electric starter to operate to crank the engine. The switch closed by the accelerator pedal is opened automatically when the engine starts by means responsive to engine intake suction, and is prevented thereafter from closing until the engine stops and the accelerator pedal is returned to engine idling position.

The present application describes and claims the accelerator pedal operated switch, claims to which were originally presented in Dyer's application, Serial No. 653,983 and were divided out; and the present application also discloses an improvement on the type of accelerator pedal operated switch disclosed in said Dyer application.

Accordingly, the objects of the invention of the present application reside in certain improvements in accelerator pedal operated and engine suction operated switches whereby the efficiency of their operation, the durability of their construction and the economy of their manufacture are realized.

Further objects and advantages of the present invention will be apparent from the following description, reference being had to the accompanying drawings wherein a preferred embodiment of the present invention is clearly shown.

In the drawings:

Fig. 2 is an end elevation of the form of accelerator pedal operated switch.

Fig. 3 is a section on the line 3—3 of Fig. 2 with the parts in normal inoperative position.

Fig. 4 is a partial section on the same line as Fig. 3, showing the parts in position corresponding to the full open position of the accelerator pedal and the switch contacts in open position.

Figs. 5, 6 and 7 are sectional views on the line 5—5 of Fig. 3 showing parts in elevation and showing the position of the switch contacts and associated parts in inoperative, cranking and running positions respectively.

Fig. 8 is a perspective view of the plate carrying the fixed switch contacts and the subassembly unit which includes the movable switch contact and supporting plate therefor.

Fig. 9 is a perspective view of the subassembly unit viewed from a different direction and the main switch housing.

Figs. 10, 11 and 12 are exploded views showing the position of various separate parts shown in Figs. 5, 6 and 7 respectively.

Fig. 13 is a perspective view of one of the clutch members shown in Figs. 8 to 12.

Fig. 21 is an exploded view in perspective of the parts of the switch shown in Figs. 14 to 20.

Figure 1:
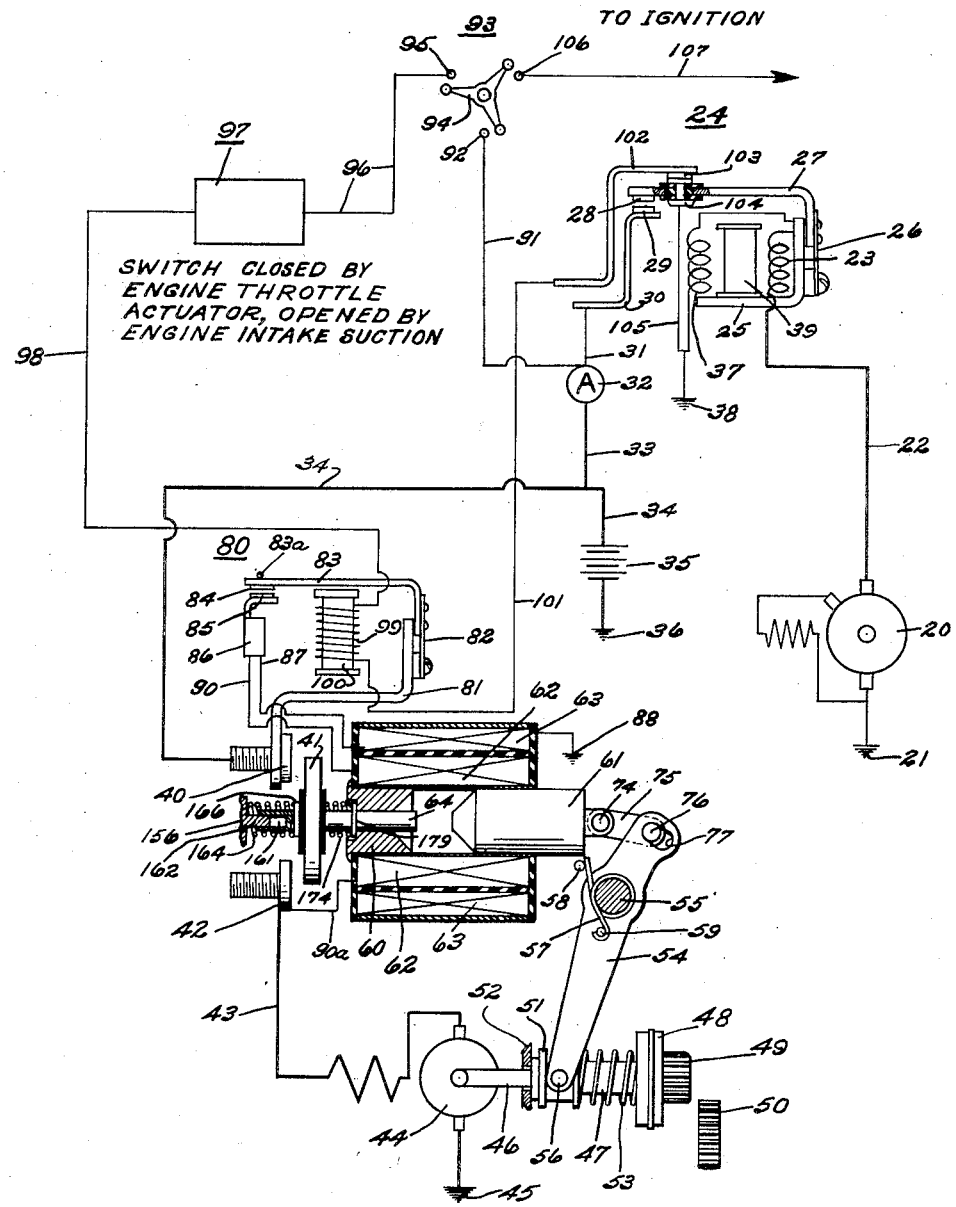
Fig. 1 is a wiring diagram illustrating the use of the present invention.

In Fig. 1, 20 designates a generator grounded at 21 and connected by a wire 22 with the current winding 23 of a reverse current relay 24. Winding 23 is connected with the frame 25 of relay 24 which frame supports a leaf spring hinge 26 to which one end of the armature 27 is attached. Armature 27 carries a contact 28 engageable with its stationary contact 29 carried by bracket 30 connected by wire 31 with an ammeter 32 connected by wires 33 and 34 with the battery 35 grounded at 36. This completes the generator to battery circuit. A voltage coil 37 is connected with the relay frame 25 and is grounded at 38. The frame 25 supports a core 39 which is surrounded by the windings 23 and 37 although these windings are shown in the drawings as separated from the core 39. The relay contacts 28 and 29 are closed to complete the battery charging circuit due to the magnetic action produced by current flowing through the voltage winding 37 after the generator has attained a certain voltage. When the contacts 28 and 29 are closed, current then flows through the winding 23 which then cooperates with winding 37 to hold the armature 27 in position to maintain the contact 28 in engagement with the contact 29. It is therefore apparent that the relay can be adjusted so that its contacts will not be separated due to the action of the spring hinge 26 until after the voltage of the generator has fallen substantially below that voltage required for the closing of the relay contacts 28 and 29.

The main engine cranking circuit comprises the battery 35, wire 34, switch contact 40, movable contact 41, switch contact 42, wire 43, starting motor 44 which is grounded at 45, and battery ground connection 36. The starting motor 44 operates the shaft 46 along which slides a sleeve 47 which is splinedly connected to the shaft 46 and which is operatively connected through a one way or overrunning clutch 48 with a pinion 49 engageable with the engine fly wheel gear 50. The sleeve 47 is surrounded by a grooved collar 51 which is slidable along the sleeve 47 but normally is held against a shoulder 52 at the left end of the sleeve 47 by a spring 53 interposed between the collar 51 and the clutch 48. The collar 51 is caused to move toward the right in the drawing by lever 54 pivotally mounted upon a shaft 55 and carrying at its lower end a pin 56 received by the groove of the collar 51. Movement of the lever 54 counterclockwise will cause the sleeve 47 to be moved toward the right and the pinion 49 to become engaged with the fly wheel gear 50. The pinion 49 is withdrawn from the gear 50 by the operation of a spring 57 which surrounds the shaft 55 and bears at one end against a stationary stop 58 and at the other against a stop 59 carried by the lever 54.

The lever 54 is actuated and the switch 40, 41, 42 is closed by electromagnetic means which comprises a solenoid core 60 and a solenoid armature 61 which are surrounded by electromagnet windings 62 and 63. The solenoid core 60 is provided with a central bore for receiving a horizontally slidable plunger or rod 64 provided with two shoulders 166 and 179 between which an insulatingly mounted movable contact 41 is relatively slidable. A spring 174 urges the contact 41 against the shoulder 166. The rod 64 is normally held in the position shown in the drawings with its shoulder 179 bearing against the magnet core 60 due to the action of a spring 164 bearing at one end against the shoulder 166 and at the other end against a stationary part 156 having a projection 162 telescopically fitting within a recess or central bore 161 in the rod 64. The solenoid armature 60 is connected by a pin 74 with a link 75 which carries a stud 76 received by a slot 77 provided in the upper end of the lever 54.

When sufficient current passes through the windings 62 and 63, the armature 61 is caused to move toward the left in order to effect counterclockwise movement of the lever 54 and the movement of the pinion 49 into mesh with the engine gear 50. This movement of the solenoid 61 also causes the rod 64 to move to the left carrying with it, due to the action of the spring 174, the switch contact 41 which is yieldingly pressed into engagement with the contacts 40 and 42 due to the yielding action of the spring 174. When this occurs, current will flow from the battery to the motor 44 thereby causing rotation of its armature shaft 46 and the pinion 49 driven thereby through the splinedly connected sleeve 47 and the overrunning clutch 48, thereby causing the fly wheel gear 50 to rotate and the engine to be cranked for starting purposes. Should the engine fail to start and the pinion 49 fail to be withdrawn from the fly wheel gear 50 by the action of the spring 57, it is possible to open the circuit of the starting motor by disconnecting the magnet coil windings 62 and 63 from the storage battery, the connections to which are to be described later. When the magnet coils 62 and 63 are deenergized, movement of the contact 41 away from the contacts 40 and 42 by the action of spring 164 may take place due to the fact that the solenoid 61 may move toward the right slightly although the lever 54 may not be turned. This is possible due to the lost motion connection provided by the pin 76 and the slot 77 between the solenoid armature 61 and the lever 54.

Should the end faces of the teeth of the pinion 49 abut with the end faces of the gear 50 before meshing, it is possible to close the motor circuit in order that the pinion 49 may be rotated into meshing relation with the engine gear 50. This is possible due to the fact that the motor switch 40, 41, 42 can be closed before the meshing of pinion 49 with gear 50 takes place. The solenoid armature 61 operates to close the motor switch and to move the pinion 49 toward the gear 50; but, after the pinion 49 collides with the gear 50, the spring 53 is compressed beyond its initial state of compression. Then when the motor shaft 46 turns to relieve the condition of gear tooth abutment, the spring 53 is released quickly to snap or jump the pinion 49 into engagement with the engine gear 50.

The circuit for connecting the magnet windings 62 and 63 with the storage battery 35 comprises the following circuit: battery 35, wire 34, contact 40, frame 81 of the starter control relay 80, leaf spring hinge 82, armature 83, contact 84, stationary contact 85, bracket 86, wire 87, winding 63, ground connection 88 and battery ground connection 36. Stop 83a limits upward movement of armature 83. The circuit of the other winding 62 includes the foregoing circuit as far as the bracket 86. From the bracket 86 a wire 90 leads out to connect with the coil 62 which is connected by wire 90a with the contact 42. The circuit of coil 62 is completed to the battery through the motor 44 and ground connections 45 and 36. It is apparent that when the contacts 84 and 85 of the starter relay 80 are closed, current will flow through both windings 62 and 63 to cause the solenoid 61 to move toward the left in order to shift the pinion 49 into engagement with the gear 50 and to close the motor switch 40, 41, 42. When the motor switch closes, the winding 62 will be short circuited. The winding 62 is made preferably of relatively coarse wire whereas the winding 63 is constructed of relatively fine wire. Both windings 62 and 63 are required to draw the armature 61 across to the core 60, but when this relation has been established, the one winding 63 is all that is required to maintain this relationship. Therefore the winding 62, which consumes the greater amount of current, is short circuited so that the starting motor will have adequate current for cranking the engine.

The circuit of the engine starter control relay 80 comprises battery 35, wire 34, wire 33, ammeter 32, wire 91, stationary contact 92 of ignition switch 93, movable contact 94, stationary contact 95, wire 96, switch 97, wire 98, relay magnet coil 99 surrounding core 100, wire 101, bracket 102, contact 103 cooperating with movable contact 104 insulatingly carried by armature 27 of cut out relay 24, wire 105, and ground returns 38, 36 to battery 35. When the movable switch contact 94 of ignition switch 93 engages contacts 92 and 95 it also engages a contact 106 connected by a wire 107 with the ignition apparatus of the engine. The switch 97 is one which is closed manually and is open automatically when the engine starts. The switch 97 is preferably actuated by the engine throttle actuator or accelerator pedal. It is opened automatically preferably by means responsive to engine intake suction. The switch contacts 103, 104 of the cut out relay 24 are normally closed.

To start the engine, the operator turns on the ignition switch 93 to cause the contact 94 to engage contact 92, 95 and 106. The operator closes the switch 97 preferably by means coordinated with the accelerator. This causes current to flow from the battery through the coil 99 of the starter control relay 80 whereupon contacts 84 and 85 are closed, whereupon the magnet coils 62 and 63 are energized to effect the shifting of the starter pinion 49 into mesh with the engine fly wheel gear and then closing of the main motor switch 40, 41, 42. The engine therefore starts in the manner described. When the engine becomes self-operative, suction produced by the engine will open the switch 97; and, in response to the voltage of the generator 20 driven by the engine, the switch 103, 104 will be open. Hence the circuit of the coil 99 of the starter control relay 80 is opened by two switches connected in series to insure the discontinuance of the engine starting function as soon as possible after the engine becomes self-operative and the prevention of the operation of the starter thereafter or until the engine has stopped.

The particular system shown in Fig. 1 constitutes an improvement in the system disclosed in Dyer's application Serial No. 653,983 and is described and claimed in the co-pending application of John B. Dyer and William E. Brown, Serial No. 735,102, filed July 14, 1934.

An improved form of electromagnetic device for shifting the motor pinion 49 into mesh with the engine gear 50 and for closing the motor switch 40, 41 and 42 is described and claimed in the copending application of John B. Dyer, Serial No. 653,983, filed January 28, 1933.

As stated previously, the switch 97 is designed to be closed by operation of the accelerator pedal and to be opened by engine suction. This switch is best shown in Figs. 3 to 12 inclusive and comprises a cup-shaped sheet metal housing 210 which is closed at one end by a plate of insulating material 212 which supports the fixed contacts of the switch as is more fully described hereinafter, and at the other end is closed except for a small central opening. This housing is secured by rivets 214, one of which projects into the housing 210 to form a stop for a purpose later set forth, to a sheet metal shell 216 which forms part of a diaphragm chamber, a second similar shell 218 forming the other part of such chamber. These shells are flanged at their periphery and are joined in any suitable way so as to form a fluid tight joint with a flexible diaphragm 220 secured between the flanges of the shells. A supporting plate 222 has a projection 223 at its center which engages the shell 218 as indicated in Fig. 3, when the parts are assembled, so as to leave a space between the outer part of the plate and shell 218 so as to permit machine screws 224 to be positioned in suitable holes in the plate 222 with the heads of the screws between the shell 218, said plate providing a convenient means for supporting the switch unit, these screws being adapted to cooperate with some suitable bracket extending from some part of the engine or other suitable supporting means. The plate 222 is secured to shell 218 by a nipple 226 which has a reduced end 228 extending through aligned orifices in the shell 218 and plate 222, the end of this reduced portion being spun over the inner edge of the shell 218 to hold the shell and plate against a shoulder formed by the reduced portion of the nipple, as indicated in Fig. 3.

A reducing coupling 230 is screwed into the opposite end of the nipple and a suitable packing washer 232 is used to form a fluid tight joint. The nipple is partially closed by a partition 234 integral therewith and a hole of relatively small size 236 is provided therein through which the engine suction is communicated to the diaphragm. The end of the reducing coupling is threaded as indicated in Fig. 3, so as to be connected to a suitable suction connection extending to the intake manifold. A cup-shaped washer 238 is held against the diaphragm when the parts of the switch are assembled and received between this washer and the partition 234 in the reducing coupling is a spring 240 which, when the engine is not running, is adapted to hold the parts of the switch in the position shown in Fig. 3.

Journaled in the plate of insulating material 212 is a stud or spindle 242 to the outer end of which is secured the accelerator pedal actuated operating arm 241 in the outer end of which is an orifice 246 in which some suitable operating connection adapted to extend to the accelerator pedal may be secured. At the other end of the arm 241 is a bent over tang 248 adapted to cooperate with shoulders 250 and 252 formed on a raised portion of the plate 212 which act as stops to limit the movement of the operating arm, while a lug 253 projecting from the arm is adapted to cooperate with a suitable mark on the plate 212 to indicate where the arm should be positioned when adjusting its operating mechanism.

The arm 241 is secured by riveting or otherwise on a flattened extension 243 of the spindle or stud 242 which at the other end is provided with a reduced portion 254 which extends through an opening in a switch operating member 256 and is bent over the edge of said opening to secure the switch operating member against a shoulder formed by said reduced portion 254. The member 256 has lugs 258 projecting therefrom which are adapted to operate the movable switch contact, flanges 260 being provided on these lugs to engage a cooperating member carried by a rotatable carrier which supports the movable switch contact as hereinafter described.

The stud or spindle 242 is provided with an axial recess 261 in one end of which is supported a pin 262 on which the movable switch contact and the carrier therefor are rotatably supported and at its other end the pin 262 has a reduced extension 264 which extends through the diaphragm 220 and the washer 238, being riveted over the washer so that the pin is reciprocated in an axial direction as the diaphragm moves back and forth under the influence of engine suction. Secured between an enlarged part 266 of the pin, which projects through the opening in the housing 210 previously referred to, and the diaphragm 220, is a suitable metal washer 268 which serves to give the diaphragm assembly greater rigidity and strength.

Supported on the pin 262 immediately to the left of the enlarged portion 268 of such pin in Fig. 3 of the drawings is a carrier plate of insulating material 270 which supports the movable switch contact, the carrier plate, the contact and associated parts forming a subassembly unit best shown in Figs. 8 and 9. The movable contact is a ring 272 of brass or other suitable metal, having three raised segments 274 thereon which form contact surfaces adapted to be brought into contact with the fixed contacts 275 and 277 carried by the plate 212 and connected to binding posts 276 and 278 respectively, to which are connected the wires 96 and 98 previously referred to. Projecting from the movable contact 272 in a direction normal to the contacting surface and parallel to the axis of pin 262 are tangs or lugs 280 which project through notches 282 in the carrier plate 270 and are bent over at the ends as indicated at 284, so that no relative rotary movement of the contact and carrier plate can take place. A coil spring 286 which is received between the movable contact and the plate 270 normally holds the parts in such position that the bent over portions 284 of the tangs engage the plate 270, as shown in Fig. 3, but permits movement of the contact toward the plate 270 under certain circumstances.

Adjacent the carrier plate 270 is a contact operating member 288 which is secured to the plate by lugs 290, which project through the carrier and extend into notches of a washer 292 on the opposite side of the plate 270, while a cross pin 294 passes through a hole in the pin 262 to hold the carrier plate 270 and the switch operating member 288 in position against the enlarged portion 268 of the pin 262, as shown in Fig. 3, so that the plate 270 moves with pin 262 as it is reciprocated by suction. As best shown in Figs. 3 and 8, the operating member 288 is provided with lugs 296 extending in a direction parallel to the axis of the pin 262 and projecting into spaces between the flanges 260 of the lugs 258 which extend from the member 256, so that when member 256 is rotated, the flanges 260 will engage the lugs 296 to rotate the carrier 270 and the movable contact 272. The members 254 and 288 form a sort of switch operating clutch which is released by engine suction.

The carrier plate 270 is also provided with projecting lugs 298 which cooperate with the post 214 to limit the movements of the carrier 270 and the switch contact carried thereby. A spring 300 is received between the washer 292 and the closed end of the housing 210 and cooperates with springs 240 and 286 to normally hold the carrier plate and movable contact carried thereby in the position shown in Fig. 3 with the movable contact engaging the plate of insulating material 212, but in such position that the contact surfaces 274 engage the surface of the plate 212 between the fixed contacts 275 and 277, so that in order for the contacts to be closed, the arm 241 must be operated to rotate the movable contact into engagement with the fixed contacts. This spring 300 has one end 301 extending through a hole in the housing 210 and the other end through a hole 302 in the washer 292 and in the plate 270 so that such spring exerts a force tending to rotate the plate 270 and parts carried thereby in a counter-clockwise direction, tending to hold the plate in the position shown in Fig. 5, with a lug 298 engaging the post 214. The spring also operates to return the plate to this position after the plate has been moved clockwise to close the switch contacts by operation of arm 241.

The operation of the switch is substantially as follows. When the engine is not running and the parts are in normal position they occupy the position shown in Fig. 5 with the contact surfaces 274 in engagement with the insulating plate. In order to close the contacts the operating arm 241 is moved in a clockwise direction causing the flanges 260 to engage the lugs 296 rotating the plate 270 and movable contact carried thereby so as to bring the parts to the position shown in Fig. 6 in which position the contact surfaces 274 engage the contacts 275 and 277. As previously described, this will cause the starting motor to become operative and the arm 241 may be moved to whatever position is desired so that the throttle may be opened to its fullest extent without moving the contact surfaces 274 out of engagement with the contacts 275 and 277. The contacts 275 and 277 are 120° apart, while the arm 241 only moves 90° from fully closed to fully open position of the throttle so that after contact, the surfaces of the movable contact are brought opposite contacts 275 and 277 and they remain opposite such contacts during the entire movement of arm 241 toward open throttle position, as long as the engine is not running, the suction during the cranking operation not being enough to overcome the pressure of springs 240 and 300.

When the engine starts running, suction is communicated to the right hand side of the diaphragm in Fig. 3, which will draw the diaphragm to the right overcoming the pressure of the springs 240 and 300, thus moving the pin 262 to the right and carrying the plate 270 and the whole movable contact assembly to the right, disengaging the movable contact from the contacts 275 and 277 and effecting the opening of the starting motor circuit in the manner previously described. As soon as the lugs 296 are disengaged from the flanges 260 during the movement of the member 288 to the right, the spring 300 rotates the plate 270 and contact 274 and other parts carried by the plate back to the position shown in Figs. 5 and 7, the arm 241 occupying the position shown in Fig. 6 or 7, or any intermediate position.

If, for any reason the suction falls when the operating arm 241 is in any position other than that shown in Fig. 5, the switch cannot be closed because upon movement of the plate 270 and parts carried thereby to the left, the lugs 296 would engage the flanges 260, stopping the movement of the contact 274 toward the left before it engages the surface of plate 212 to occupy its original position. Only when arm 241 is restored to the normal position shown in Fig. 5, so that lugs 296 lie opposite the notches between flanges 260 can the switch 97 be closed subsequent to opening of the switch by engine suction. Therefore, no matter what suction conditions are maintained during engine operation, the switch 97 cannot be accidentally closed as long as the engine continues to run.

Figs. 15 to 21 inclusive show an improved form of the switch 97. The parts of this second form of switch 97 have been given numbers which are the same as the numbers of the corresponding parts of the first switch 97, but with the affix "a". By this system of numbering, the similarity of the parts of the second switch 97 to the parts of the first switch 97 will be at once apparent. Therefore, no description will be given with respect to similarity of construction and functions. The following improvements are however emphasized.

The shaft 243a carries integral flanges 268a whereas shaft 243 carries a separate piece 256 which provides flanges 260.

Figure 16:
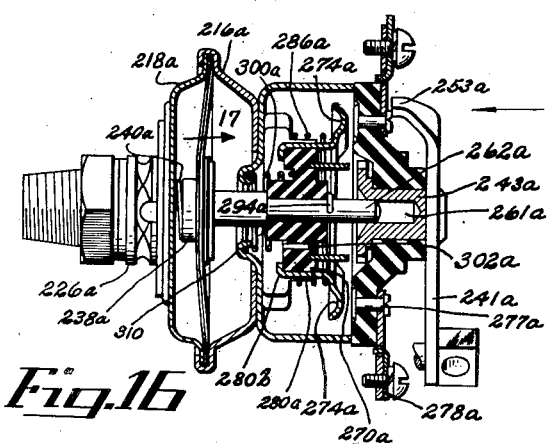
Fig. 16 is a view similar to Fig. 15 showing the movable contact separated from the stationary contact carrier.
Figure 17:
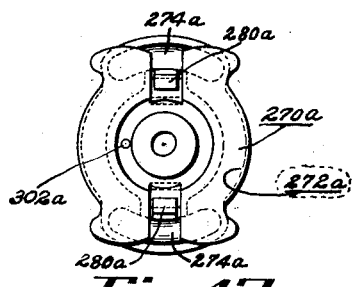
Fig. 17 is a view looking in the direction of arrow 17 in Fig. 16 and shows the movable switch contact and contact carrier assembly.
Figure 18:
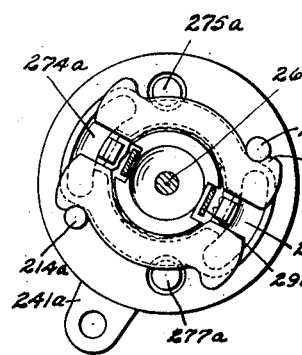
Figs. 18, 19 and 20 are views looking in the direction of arrow 17 of Fig. 16 and are views showing, respectively, the relations between the movable switch contact and the stationary contacts in inoperative, engine cranking and engine running positions.
Figure 19:
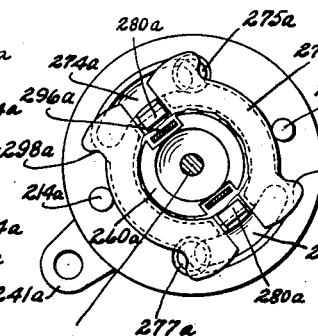
Figure 20:
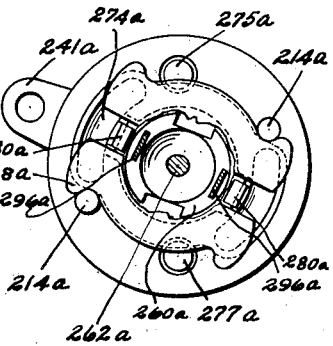

The nonconducting contact carrier 270a is much heavier than carrier 270 and is provided with a hub 270b of substantial length, through which the rod 262a passes. The carrier 270a is therefore sturdily supported by the rod 262a. The carrier is preferably made of molded insulating material which is molded around inserts which provide the clutch tangs 296a. Hence these tangs 296a are practically integral with the carrier 270a instead of being carried by a separate metal piece 288 (see Fig. 13). The carrier 270a provides substantially long guides for the tangs 280a of the movable contact ring 272a, said tang 280a being bent over at 280b (see Fig. 16) to limit separation of the contact 272a from the carrier when the contact 272a is separated from the switch back or stationary contact block 212a, as shown in Fig. 16.

The stop studs 214a which cooperate with lugs 298a to limit rotary movement of the carrier 270a are carried by the block 212a instead of by the back wall of the switch case 210a. The carrier 270a is returned by spring 300a from the position shown in Fig. 19 to the position shown in Fig. 20 when the clutch members 260a and 296a are separated. Spring 300a is a torsion spring having an end 301a received by a slot 301b in the back wall of the case 210a (see Fig. 21), and having an end 302b received by a hole 302a provided by the carrier 270a. Spring 300a is seated in an annular groove 310 provided by switch case 210a and in an annular groove 311 provided by carrier 270a.

Figure 15:
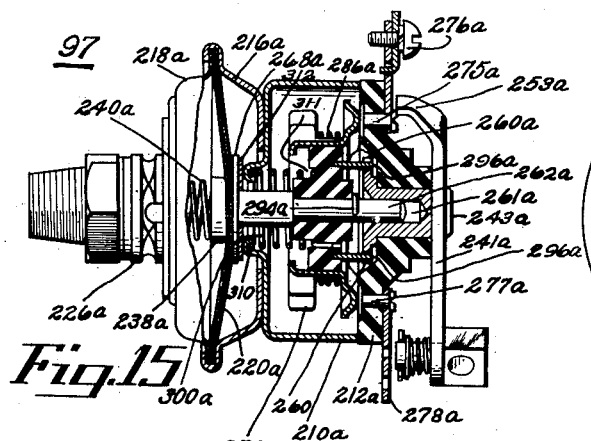
Fig. 15 is a sectional view taken on the line 15—15 of Fig. 14, and showing the movable switch contact bearing against the carrier for the stationary switch contacts.
Figure 14:
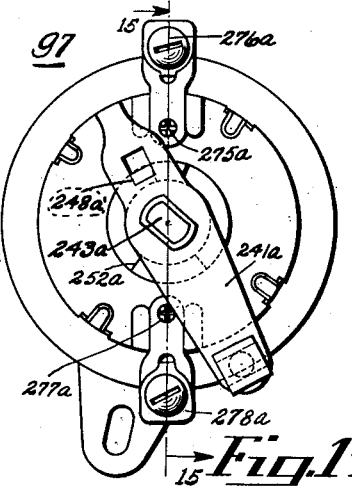
Fig. 14 is an end view of a modified form of accelerator pedal operated switch.

Movement of diaphragm 220a toward the right, by the action of spring 248a, in Fig. 15 is limited by a washer 312, located adjacent washer 268a and surrounding rod 262a, striking a stop provided by that portion of the end wall of case 210a which provides the groove 310. Movement of the diaphragm 220a toward the left is limited by the carrier 270a striking the back wall of case 210.

The construction and mode of operation of the second switch is the same as that of the one first described, but for one exception. In the first described switch the distance between the element 270 and the tangs 284, is such when the switch is closed and the parts in the position shown in Fig. 3, that when the suction becomes effective on the diaphragm and moves the several parts toward the right in this figure, the element 270 engages tangs 284 to move the contact member 272 out of engagement with the fixed contacts before the lugs 296 are disengaged from the member 258 operated by the accelerator pedal. Therefore in this form of device the breaking of the circuit takes place before the movable switch member is disconnected from its operating means which, in turn, is operated by the accelerator pedal.

In the second form of switch the distance from the surface of the insulating material to the tangs 280b is sufficient when the parts are in normal position as in Fig. 15 to permit the disengagement of the lugs 296a, corresponding to lugs 296, from the member operated by the accelerator pedal which operates the movable contact member, before the insulating block engages tangs 280b to move the movable contact out of engagement with the fixed contacts and break the circuit, upon movement of the diaphragm to the left under the influence of engine suction. In the second form of switch, therefore, the breaking of the circuit takes place after the disconnection of the movable contact from its operating means.

This arrangement is provided to guard against accident under certain conditions. For instance, with the first form of switch if the throttle might be opened somewhat after the circuit is opened but before release of the movable contact from its operating means is effected, a reduction in vacuum is brought about which might cause the closing of the switch if the drop in vacuum was sufficient. With the second form of switch this difficulty would be impossible because immediately upon disconnection from the operating member corresponding to 258 the movable contact would be reversely rotated to its initial position in which it does not engage the fixed contact. In this way the circuit would also be opened, even if the suction is not great enough to move the said movable contact bodily out of engagement with the fixed contact, as previously described.

While the forms of embodiment of the present invention as herein disclosed, constitute preferred forms, it is to be understood that other forms might be adopted, all coming within the scope of the claims which follow.

What is claimed is as follows:

1. A switch for controlling a circuit comprising a fixed contact, a rotatably mounted carrier plate, a movable contact mounted thereon, means for normally holding said carrier plate in such position that the movable contact lies in the same plane as the fixed contact, means for rotating the carrier plate to bring said contacts into engagement in order to close said circuit and means for moving said carrier plate and the movable contact supported thereby bodily in a direction substantially normal to the surface of the fixed contact to open said switch so as to break the circuit.

2. A switch comprising a fixed contact, a rotatably mounted carrier plate, a movable contact mounted thereon, means for rotating the carrier plate to bring said contacts into engagement, means for moving said carrier plate and the movable contact supported thereby bodily in a direction substantially normal to the surface of the fixed contact to separate the switch contacts, means for reversely rotating the carrier plate after opening of said switch and means for preventing movement of the rotatable contact toward the fixed contact after such reverse rotation.

3. A switch comprising a fixed contact, a rotatably mounted carrier plate, a movable contact mounted thereon, means for rotating the carrier plate to bring said contacts into engagement, means for moving said carrier plate and the movable contact supported thereby bodily in a direction substantially normal to the surface of the fixed contact to separate the switch contacts, means for reversely rotating the carrier plate after opening of said switch and means for preventing movement of the rotatable contact toward the fixed contact after such reverse rotation until the means for rotating the carrier plate has been restored to its original position.

4. A switch comprising a fixed contact, a rotatably mounted carrier plate, a movable contact mounted thereon, means for rotating the carrier plate to bring said contacts into engagement, means for moving said carrier plate and the movable contact supported thereby bodily in a direction substantially normal to the surface of the fixed contact to separate the switch contacts, means for reversely rotating the carrier plate after opening of said switch, means for preventing movement of the rotatable contact toward the fixed contact after such reverse rotation of the carrier plate, and means permitting relative bodily movement of the carrier plate toward the movable contact when said last named means is effective.

5. A switch comprising a fixed contact, a rotatably mounted carrier plate, a movable contact mounted thereon, means for rotating the carrier plate to bring said contacts into engagement, suction operated means for moving said carrier plate and the movable contact supported thereby bodily in a direction substantially normal to the surface of the fixed contact to separate the switch contacts, means for reversely rotating the carrier plate after separation of said contacts and means for preventing movement of the rotatable contact toward the fixed contact after such reverse rotation.

6. A switch comprising a fixed contact, a rotatably mounted carrier plate, a movable contact mounted thereon, means for rotating the carrier plate to bring said contacts into engagement, suction operated means for moving said carrier plate and the movable contact supported thereby bodily in a direction substantially normal to the surface of the fixed contact to separate the switch contacts, means for reversely rotating the carrier plate after separation of said contacts, and means operative upon reduction of the suction effective on said suction operated means after such reverse rotation of the carrier plate to prevent movement of the rotatable contact toward the fixed contact.

7. A switch comprising a fixed contact, a rotatably mounted carrier plate, a movable contact mounted thereon, means for rotating the carrier plate to bring said contacts into engagement, suction operated means for moving said carrier plate and the movable contact supported thereby bodily in a direction substantially normal to the surface of the fixed contact to separate the switch contacts, means for reversely rotating the carrier plate after separation of said contacts, and means operative upon reduction of the suction effective on said suction operated means after such reverse rotation of the carrier plate to prevent movement of the rotatable contact toward the fixed contact until the means for rotating the carrier plate has been restored to original position.

8. A switch comprising a fixed contact, a rotatably mounted carrier plate, a movable contact mounted thereon, an operating member for rotating the carrier plate to bring the contacts into engagement, means on said carrier plate adapted to be engaged by said operating member, means for disengaging said last mentioned means from said operating member and means for reversely rotating said carrier plate subsequent to such disengagement of said means from said operating member.

9. A switch comprising a fixed contact, a movable contact, means for moving said movable contact in a plane parallel to the surface of the fixed contact so as to move it into engagement therewith, means for moving the movable contact bodily in a direction substantially normal to the surface of said fixed contact to open said switch and means whereby the operating means for said movable contact is rendered ineffective to move said contact subsequent to said bodily movement so as to permit movement of said operating means independently of the movable contact.

10. A switch comprising, in combination, a terminal plate carrying stationary contacts, an operating shaft journalled in said plate and carrying a coupling member, a rod longitudinally movable axially of said shaft, a non-conducting contact carrier supported by said rod for axial movement therewith and for rotary movement relative to the stationary contacts, a movable contact supported by the carrier and normally engaging the terminal plate and rotatable into engagement with the stationary contacts, a coupling member embedded in the carrier and engageable by the coupling of the shaft, means for rotating the shaft so as to cause the movable contact to rotate into engagement with the stationary contacts, means for moving the rod axially to separate the movable contact from the stationary contacts and to disconnect the coupling members, spring means for restoring the movable contact rotatively to normal position upon the separation of said coupling members, spring means for returning the rod to normal position, and means carried by one of the coupling members and so cooperating with the other member that reengagement of the coupling members and reengagement of the movable contact with the plate are prevented until the shaft has been rotated to normal position.

11. A switch for controlling a circuit comprising, in combination, a fixed contact, a rotatable contact movable into engagement therewith, means for operating said rotatable contact, means for automatically disengaging said rotatable contact from the fixed contact to break the circuit, and means for disconnecting said movable contact from its operating means when the circuit is broken.

12. A switch for controlling a circuit comprising, in combination, a fixed contact, a rotatable contact movable into engagement therewith, means for operating said rotatable contact, suction operated means for automatically disengaging said rotatable contact from said fixed contact to break the circuit and for disengaging said rotatable contact from its operating means before the circuit is broken.

13. A switch for controlling the circuit of the starting motor of an internal combustion engine comprising in combination, a fixed contact, a rotatable contact movable into engagement therewith, means for operating said rotatable contact, means operable by the engine for automatically disengaging said rotatable contact from said fixed contact to break the circuit and for disengaging said rotatable contact from its operating means before the circuit is broken.

14. A switch for controlling the circuit of the starting motor of an internal combustion engine comprising in combination, a fixed contact, a rotatable contact movable into engagement therewith, means for operating said rotatable contact, means operated by engine suction for automatically disengaging said rotatable contact from said fixed contact to break the circuit and for disengaging said rotatable contact from its operating means before the circuit is broken.

15. A switch for controlling a circuit comprising, in combination, a fixed contact, a rotatable contact movable into engagement therewith, means for operating said rotatable contact adapted to be operated by the accelerator pedal which controls the speed of the engine, means operable automatically by the engine for disengaging said rotatable contact from said fixed contact to break the circuit and for disengaging said rotatable contact from the operating means before the circuit is broken.

16. A switch for controlling a circuit comprising, in combination, a fixed contact, a rotatable contact movable into engagement therewith, means for operating said rotatable contact adapted to be operated by the accelerator pedal which controls the speed of the engine, means operable automatically by engine suction for disengaging said rotatable contact from said fixed contact to break the circuit and for disengaging said rotatable contact from the operating means before the circuit is broken.

17. A switch for controlling a circuit comprising in combination, a fixed contact, a movable contact adapted to be rotated into engagement with said fixed contact, means for rotating said movable contact, means for moving said rotatable contact in a direction substantially normal to its plane of rotation in order to break the circuit, and for disconnecting said movable contact from its rotating means before the circuit is broken.

18. A switch for controlling a circuit comprising a fixed contact, a rotatably mounted carrier plate, a movable contact mounted thereon, means for rotating the carrier plate to bring said contacts into engagement in order to close said circuit and means for moving said carrier plate and the movable contact supported thereby bodily in a direction substantially normal to the surface of the fixed contact to open said switch so as to break the circuit, said last named means being so constructed that the carrier plate is disconnected from its operating means before the circuit is broken.

19. A switch for controlling a circuit comprising a fixed contact, a rotatably mounted carrier plate, a movable contact mounted thereon, means for rotating the carrier plate to bring said contacts into engagement in order to close said circuit and means for moving said carrier plate and the movable contact supported thereby bodily in a direction substantially normal to the surface of the fixed contact to open said switch so as to break the circuit, said last named means being so constructed that the carrier plate is disconnected from its operating means before the circuit is broken, and means for reversely rotating said movable contact to its normal position when it is released from its operating means.

20. A switch for controlling a circuit comprising a fixed contact, a rotatably mounted carrier plate, a movable contact mounted thereon, means for rotating the carrier plate to bring said contacts into engagement in order to close said circuit and means for moving said carrier plate and the movable contact supported thereby bodily in a direction substantially normal to the surface of the fixed contact to open said switch so as to break the circuit, said last named means being so constructed that the carrier plate is disconnected from its operating means before the circuit is broken, said reverse movement operating to break the circuit if such circuit is not broken by the aforementioned bodily movement.

21. A switch for controlling a circuit comprising a fixed contact, a rotatably mounted supporting member having a movable contact mounted thereon and rotatable therewith, means for rotating said supporting member to bring the contacts into engagement in order to close the circuit, means for moving said supporting member and the movable contact supported thereby in a direction substantially normal to the plane of rotation of said supporting member, so as to disengage the switch contacts and to disconnect the supporting member from its rotating means, said movable contact and its supporting member being relatively movable in a direction normal to the plane of rotation of said supporting member, means limiting the relative movement between said movable contact and its supporting member, and constructed to permit sufficient movement of the supporting member for said member to be disengaged from its rotating means before said movable contact is moved from its plane of rotation.

22. A switch for controlling a circuit comprising a fixed contact, a rotatably mounted supporting member carrying a movable contact rotatable therewith, but slidable thereon, in a direction normal to the plane of rotation of said supporting member, a manually operable member for rotating said supporting plate and means normally coupling said supporting plate to said manually operable member for rotation therewith, means for moving said supporting member and the movable contact in a direction substantially normal to the plane of rotation of said supporting member to disengage the switch contacts and to disable said coupling means, means limiting the relative sliding movement of the movable contact and supporting member, but permitting sufficient movement of the supporting member before movement of the contact, to permit the supporting member to become uncoupled from its actuating member before the movable contact is moved out of engagement with the fixed contact.

23. A switch for controlling a circuit comprising a fixed contact, a rotatably mounted supporting member carrying a movable contact rotatable therewith but slidable thereon, means for rotating said supporting member, means for coupling the supporting member to its rotating means, means for moving said supporting member in a direction substantially normal to its plane of rotation to disengage said member from its rotating means, means on said movable contact adapted to be engaged by said supporting member as the latter is moved normal to its plane of rotation so as to disengage the movabe contact from the fixed contact to open the circuit, said last named means being engaged by said supporting member only after the latter has been moved sufficiently to become uncoupled from its rotating means.

24. A switch for controlling a circuit comprising a fixed contact, a rotatably mounted supporting member formed of insulating material and having projecting lugs adapted to be engaged by a rotatable operating member, a movable switch contact having a substantially cylindrical portion receiving said block of insulating material and slidably splined thereon for rotation therewith, means for moving said supporting member in a direction substantially normal to its plane of rotation so as to disengage the lugs thereon from said rotatable member, lugs on said movable contact adapted to be engaged by said block of insulating material as it is moved to disable the connection to its operating means to separate the switch contacts, said last named lugs being so positioned with respect to the block of insulating material that the lugs projecting from said block are disengaged from the operating means therefor before the lugs projecting from the movable contact are engaged by said block of insulating material.

25. In a starting device for internal combustion engines having a current source and a starting motor operated by current from said source, a switch for controlling the connection of said starting motor with the current source and comprising a rotatable carrier plate, a movable contact mounted thereon, means for rotating the carrier plate to bring said contacts into engagement and means operable by the engine for moving said carrier plate and the contact carried thereby bodily in a direction substantially normal to the surface of the fixed contact to open the switch when the engine is running.

26. In a starting device for internal combustion engines having a current source and a starting motor operated by current from said source, a switch for controlling the connection of said starting motor with the current source and comprising a rotatable carrier plate, a movable contact mounted thereon, means for rotating the carrier plate to bring said contacts into engagement, means operable by the engine for moving said carrier plate in a direction substantially normal to the surface of the fixed contact to open the switch when the engine is running, and means for preventing closing of the switch as long as the engine continues to run.

JOHN B. DYER.